Feb. 26, 1935.  A. T. POTTER  1,992,887
CONTROL MEANS FOR WINDSHIELDS
Filed Dec. 17, 1931  2 Sheets-Sheet 2
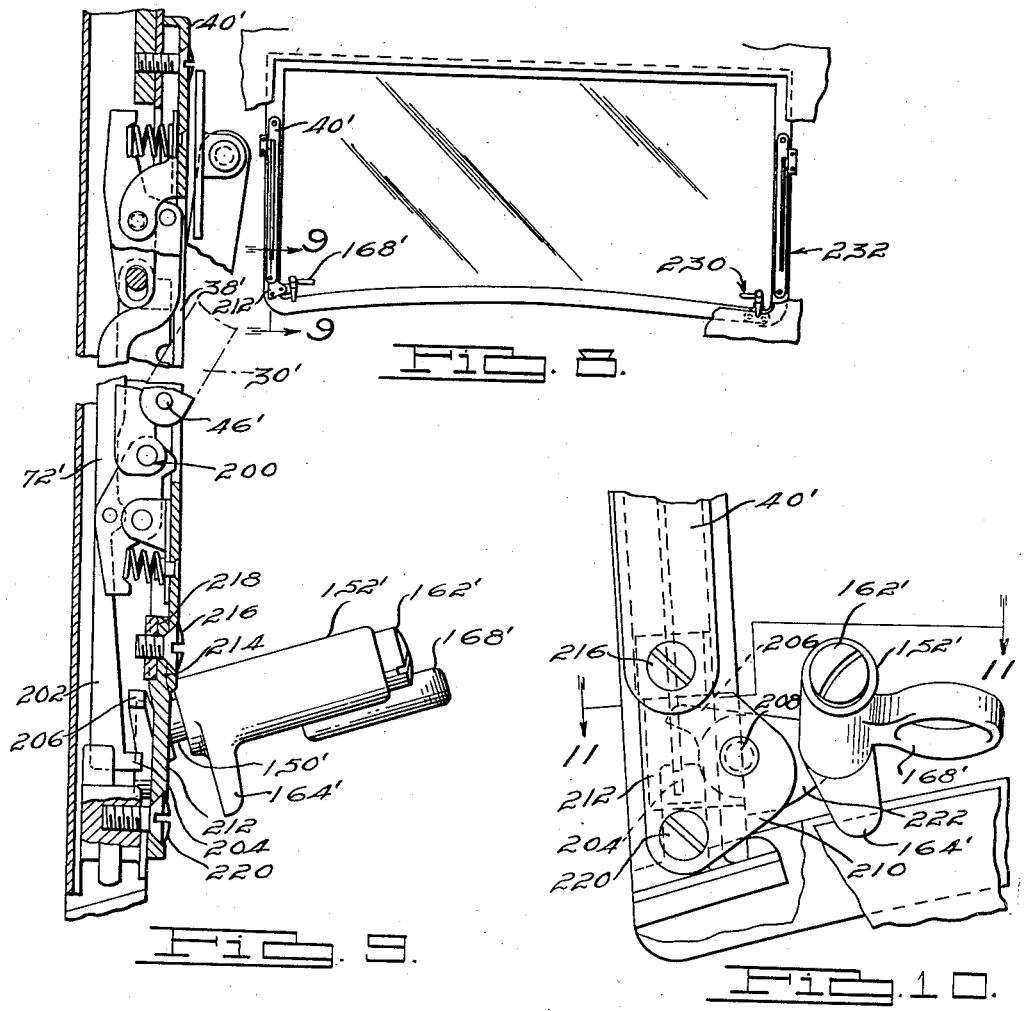
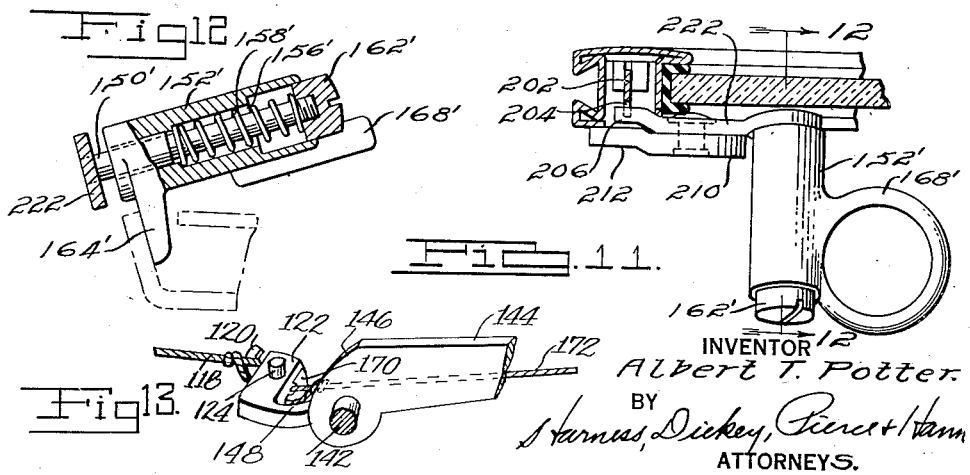
INVENTOR
Albert T. Potter.
BY
ATTORNEYS.

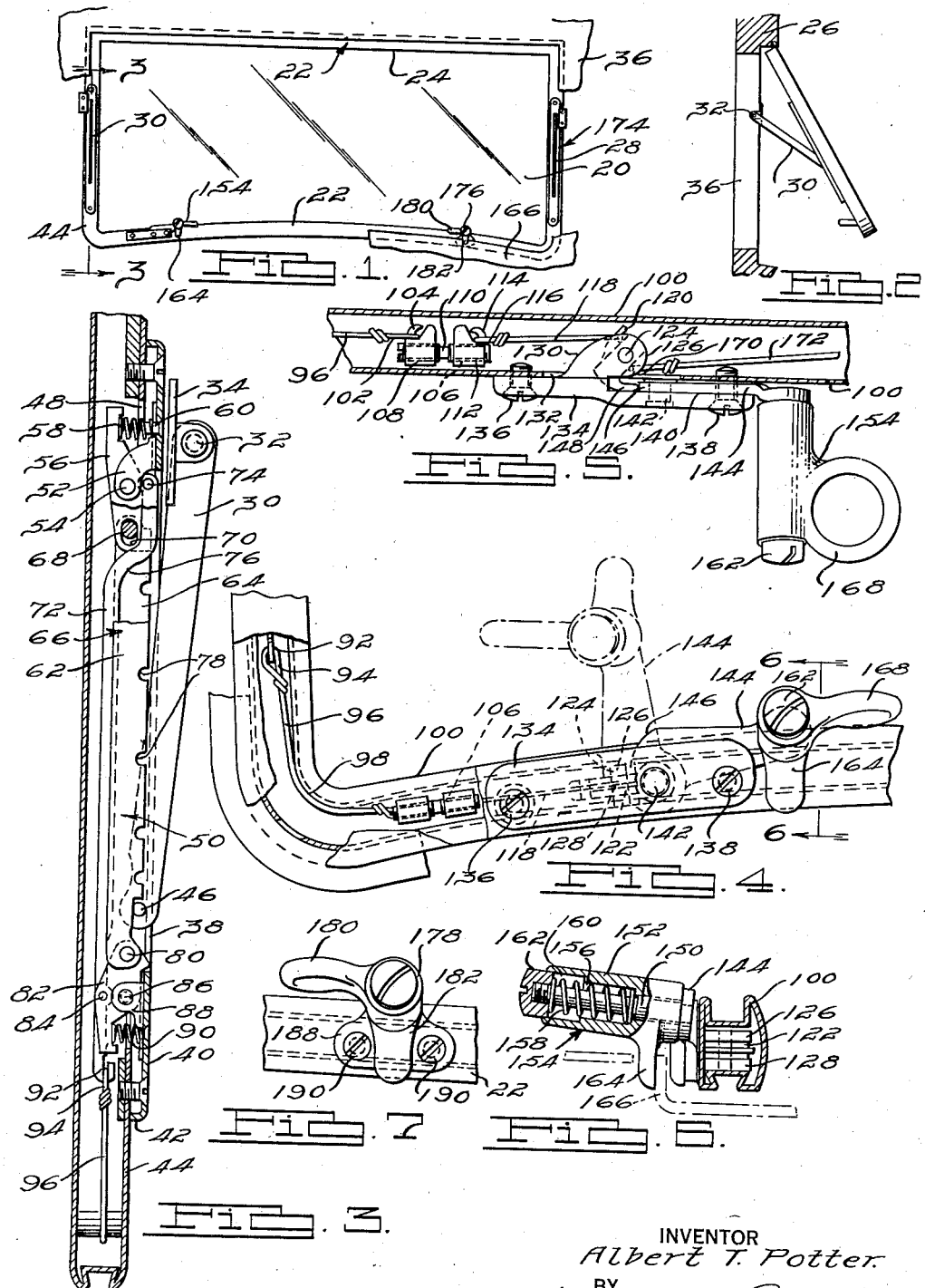

Patented Feb. 26, 1935

1,992,887

UNITED STATES PATENT OFFICE 1,992,887

CONTROL MEANS FOR WINDSHIELDS

Albert T. Potter, Detroit, Mich., assignor to Ainsworth Manufacturing Corporation, a corporation of Michigan Application December 17, 1931, Serial No. 581,649

14 Claims. (Cl. 296—84)

My invention relates to closure regulators and it has particular relation to regulating devices for adjusting and maintaining the position of closures of the type employed as windshields in automobile bodies.

The invention has for its main objects the provision of a windshield regulating device which may be manipulated with a minimum of effort upon the part of the operator; the provision of a regulator device for vehicle windshields which securely maintains the windshield in a predetermined position of adjustment; the provision of a windshield regulator which is simple in character, durable in construction and which may be manufactured at a minimum of expense; the provision of a windshield regulating device embodying a latch actuating lever that also functions as means for locking a windshield in closed position; the provision of a windshield regulating device that may be operated with one hand by means of operating members disposed in convenient reach.

These, and other objects will be apparent from perusal of the appended specification and the drawings to which the specification applies.

One conventional type of windshield structure for vehicle bodies includes a transparent panel enclosed in a suitable frame and hinged along the upper margin thereof adjacent to the forward edge of the roof of the vehicle. In the conventional structure the lower edge of the panel constituting the windshield may be swung outwardly and maintained in a predetermined angle of adjustment by means of an adjustable link, thus permitting the circulation of air through the body of the vehicle. This link is ordinarily clamped in position of adjustment by means of a thumb nut threaded upon a screw extending through a slot in one end of the link. With such construction the link is clamped in position solely by frictional engagement between the face of the thumb nut and the adjacent face of the slotted link. Obviously, to maintain adequate clamping action, it is necessary that the thumb nut be drawn very tight. Therefore, considerable effort is required both in tightening the nut and in loosening it for purposes of releasing the windshield. Such operation manifestly is objectionable, particularly to women drivers, who in some cases, do not possess the requisite strength for loosening or properly tightening the thumb nut for clamping the windshield in the position desired. Furthermore the use of both hands is required to operate the windshield and simultaneously to adjust the clamping nuts.

This invention contemplates the provision of a windshield regulating device for tiltable windshields in which the lateral edges of the windshield are interconnected with the forward body posts by means of links pivoted at one end to one member and slidably connected at the other end to the other member and which further includes interconnected latches that may be operated by one hand for positively locking the slidable ends in a predetermined position.

For a better understanding of the invention, reference may now be had to the accompanying drawings, in which:

Figure 1 is a fragmentary elevational view disclosing a tiltable windshield in connection with which my invention may be employed.

Figure 2 is a fragmentary cross-sectional view of a forward portion of the body of a vehicle with a windshield hinged in an opening therein and held in a predetermined position of adjustment.

Figure 3 is a fragmentary cross-sectional view taken substantially upon the line 3—3 of Figure 1 and disclosing the latch mechanism constituting the subject-matter of the present invention upon a larger scale.

Figure 4 is a fragmentary elevational view with certain portions broken away showing in detail the mechanism employed for operating the latch mechanism as installed in the frame of a conventional windshield.

Figure 5 is a cross-sectional view showing the device employed for operating the latch mechanism as viewed from above.

Figure 6 is a fragmentary cross-sectional view taken substantially upon the line 6—6 of Figure 4.

Figure 7 is a fragmentary elevational view of a thumb piece employed for controlling the latch operating mechanism.

Figure 8 is a fragmentary elevational view of a windshield structure employing a modified form of closure regulating device.

Figure 9 is a cross-sectional view taken substantially upon the line 9—9 of Figure 8.

Figure 10 is a fragmentary elevational view of a thumb piece and attendant elements for operating the adjustable link locking mechanism.

Figure 11 is a fragmentary cross-sectional view taken substantially upon the line 11—11 of Figure 10.

Fig. 12 is a cross-sectional view taken substantially along line 12—12 of Fig. 11.

Fig. 13 is a detailed view of the pulley and cam arrangement shown by Figs. 4 and 5.

In the form of the invention disclosed in Figures 1 to 7 inclusive, a windshield embodying a glass panel 20 and a marginal frame therefor indicated at 22, is hinged along the upper edge portion 24 to a downwardly extending portion 26 adjacent to the vehicle roof (not shown). This windshield may be swung inwardly or outwardly upon its hinge and is held in its various positions of adjustment by means of links 28 and 30. The link structures and the operating means therefor are identical and, accordingly, only one will be described in detail.

Each includes a bracket 32 having a laterally extending flange portion 34 which is secured to the forward face of a body post 36 that provides a lateral margin for the opening in which the windshield is swung. The end of the link 30 opposite to the bracket 32 extends into a vertical slot 38 best shown in Fig. 3 which is formed in a vertically disposed plate 40 having marginal flanges 42 that engage the rear face of a hollow end portion 44 of the windshield frame. It will be observed that the end of the link 30 within the slot 38 is provided with a transversely extending pin 46 which projects between the forward face of the plate 40 and the rear face of the adjacent portion of the end member 44 in such manner that the faces of these members constitute a guideway within which the pins may move as the end of the link 30 traverses the slot in which it is disposed.

As best shown in Fig. 3, the hollow end portion 44 of the windshield frame is provided with an opening 48 which extends longitudinally immediately under the plate 40 and which receives or houses a latch mechanism indicated generally at 50 for locking the pin 46 in predetermined positions of adjustment along the guideway provided by the plate 40 and the adjacent face of the frame portion 44. This latch mechanism includes a bifurcated bracket 52 which is secured to the inner face of the plate 40 adjacent to the upper end thereof. A pin 54 extends transversely of the upper end of the bracket and a rocking arm 56 is journaled thereon. The upper end of this arm is actuated away from the plate 40 by means of a coiled spring 58 between the end of the arm at the inner face of the adjacent portion of the plate 40 and is maintained from transverse displacement by means of a pin or rivet 60 extending through the plate 40 into the spring.

The lower extremity of the lever 56 is adapted transversely to reciprocate a vertical latching bar 62 which comprises parallel plates 64 and 66 disposed upon opposite sides of the extremities of the lever 56 and interconnected by means of a pin 68 which is slidably and rotatably disposed in a slot 70 provided therefor in the lower extremity of lever 56. The lever may be rotated for purposes of actuating the bar 62 outwardly, by means of a link 72 disposed in vertical position and connected to a rearwardly extending portion of the lever by means of a transversely extending pin 74. A forwardly extending offset 76 is formed in the link 72 which functions to offset the lower extremity of the link beyond the plane of the bar 62. It will be observed that the forward edge of the bar is provided with a series of semi-circular notches 78 which are adapted to receive the transverse hinge pin 46 in the slidable end of the link 30 and thus to lock the extremity of the latter link in any desired position of adjustment.

The lower extremities of the side plates 64 and 66 of the bar 62 are interconnected by means of a pin 80, which is journaled in the upper extremity of a member 82 constituting a bell crank and having a pivotal connection at 84 to the operating lever 72. Lever 82 is pivoted in a plane forwardly offset from the pivotal connection 84 by means of a transversely extending pin 86, to a forwardly extending bifurcated bracket 88 which is secured to the forward face of the plate 40. The lower extremity of the lever 82 is actuated forwardly by means of a spring 90 corresponding to the spring 58 and respectively engaging at opposite extremities with the lever and the forward face of the plate 40 adjacent thereto.

As shown in Figs. 3 and 4, the lower extremity of the actuating lever 72 is provided with a hook portion 92 which is engaged by a loop 94 upon the upper extremity of an actuating cord or wire 96 disposed within the hollow frame of the windshield. This cord extends around a curved corner portion 98 of the windshield frame and is directed laterally along the lower portion 100 thereof. The extremity of the cord is connected, as shown in Figures 4 and 5 by means of a loop 102 to a hook 104 upon a turnbuckle 106 comprising a head member 108. Turnbuckle head 108 in turn is threaded upon a screw 110 journaled in a second turnbuckle head 112, which has a hook portion 114. The latter engages a loop 116 in a cable portion 118, connected to a finger 120 upon the outer periphery of an actuating pulley 122 best shown in Figure 4. This pulley is journaled upon a pin 124, which extends transversely of upper and lower branches 126 and 128 of a bifurcated bracket 130 that extends through an opening 132, formed in the rearward face of the hollow frame portion 100. The bracket is integrally formed with a cover plate 134, closing the opening 132 and secured in position by means of screws 136 and 138 extending transversely therethrough.

As best shown in Figure 5, the member 134 is offset as indicated at 140 at one end from the adjacent face of the transverse frame portion 100 and a pin 142 extends transversely therethrough. This pin constitutes a journal for an actuating lever 144 disposed in convenient reach of the operator and having a cam portion 146, best shown in Fig. 4, that engages a cam lug 148, best shown in Fig. 5, upon the pulley 124 whereby to rotate the pulley and thus to retract the cables or wires 96 and 118 for purposes of actuating the latch operating lever 72.

A pin or stub shaft 150 shown in Figure 6 constituting a crank handle projects rearwardly from the extremity of the lever 144 and a sleeve portion 152 of a thumb piece 154 is slidably and rotatably mounted thereupon. This sleeve is bored as indicated at 156 to receive a compression spring 158 for purposes of actuating the thumb piece toward the lever 144. The bore adjacent to rearward extremity of the sleeve 152 is formed with an enlarged portion 160 which slidably receives a cap nut or a head 162 which is threaded upon the rear extremity of the pin 150 whereby to prevent displacement of the thumb piece therefrom.

As best shown in Figures 4 and 6, the thumb piece is provided with a downwardly extending arm 164 adapted resiliently to engage an upwardly extending flange 166 along the lower edge of the windshield opening. This arm functions resiliently to retract the windshield and thus to maintain the lower margin thereof from forward displacement and from rattling in its frame. The thumb piece includes a laterally projecting lug or ring 168 in which the operator may hook his finger for purposes of rotating the thumb piece and thus disengaging the arm 164 from the flange 166 and further for purposes of rotating the arm 144.

The pulley 122 is provided with a second hook-like finger 170 which is engaged within a loop in an actuating cable or wire 172 that leads to a second windshield regulating mechanism upon the side of the windshield opposite to that described. This mechanism is indicated generally by the numeral 174. Since the mechanism is identical with that already described, it is not deemed necessary to describe it in detail.

For purposes of maintaining the windshield securely in retracted position, a latch 176 is secured to the frame portion 100 upon the side opposite to the latch actuating lever 144. This mechanism is best disclosed in Figures 1 and 7. It includes a sleeve 178 having a thumb piece 180 and an arm 182 for engaging the flange 166. The mechanism includes as internal elements the pin and spring mechanism corresponding to the elements 150 and 158 as disclosed in Fig. 6. However, it is of course to be understood that since this mechanism is not employed for actuating cables corresponding to the cables 96 and 172 that the shaft is secured directly to the windshield frame member 100 instead of being mounted in the extremity of the lever 144. For purposes of providing attachments for the device it is secured to a bracket 188 which is secured to the frame member by means of screws 190.

In the operation of the invention the operator grasps the thumb pieces or rings 154 and 180 and rotates them to disengage the arms 164 and 182 from engagement with the upstanding flange 166. The piece 180 may then be released while the ring 154 is rotated and swung upwardly to the position indicated in dotted line in Figure 4, thereby causing the cam lever 144 to rotate and the cam surface 146 to actuate the cam 148 which in turn rotates the pulley 122. The wire 118, together with the wires 96 and 172 are thus tensioned to draw the latch actuating bars 72 downwardly. Movement of the bars in turn rotates the lever 56 and the lever 82 about their respective axes thus causing the pins 68 and 80 to move rearwardly and correspondingly moving the bar 62 rearwardly to disengage the bars 64 and 66 from the pin 46.

By the application of pressure against the lower portion of the windshield or against the thumb piece 152 the lower edge of the windshield will be tilted outwardly and the lower end of the link 30 will travel upwardly guided by engagement of the pin 46 with the forward face of the plate 40. After the windshield has been tilted to a desired degree the lever 144 is rotated to its normal position thus releasing the tension upon the cords 96 and 172 to permit the levers 56 and 82 to rock and thus bring the notches 78 in the bar 62 into engagement with the pin 46. The extremity of the bar 30 is thus clamped in the desired position of adjustment thereby securely holding the windshield in any preferred position.

In order to release the windshield and thus permit it to be swung to its original position, it is merely necessary to rotate the lever 144 to tighten the wires 96 and 172 to retract the bar 72 and thus release the notches 78 from engagement with the pin 46. The windshield will then swing downwardly either under its own weight or by the application of a slight rearward pull upon the rings 154 and 180. It will be understood that a relatively light force exerted against the finger piece or lug 154 is sufficient adequately to tension the cords 96 and 172 to retract the latch actuating bar 72 thereby releasing the pin 46. Slight pressure is then sufficient to swing the windshield to a desired position of adjustment. The latches and the windshield may be operated by latches placed in convenient reach. The necessity of binding produced by the ordinary screw and nut clamping devices heretofore employed for securing the windshield regulating links is thus obviated.

In the form of the invention disclosed in Figures 8 to 12, inclusive, a windshield regulating link 30' corresponding to the link 30 as disclosed in Figs. 1 to 7, inclusive, is slidably disposed at one end within a slot 38' in a plate 40' corresponding to the plate 40 disclosed in the previously indicated form of the invention. The end of the link within the slot is provided with a transverse pin 46' corresponding to the pin 46 and this pin is maintained in any desired position of adjustment within the slot by means of a latch mechanism indicated generally by the numeral 200 and corresponding in substantially all details to the mechanism previously described.

In view of the identity of the mechanism with that already disclosed and described, complete description thereof is believed to be unnecessary. The latch mechanism 200 includes an actuating bar 72' corresponding to the bar 72 and this bar has a downwardly projecting portion 202 which at its lower extremity is provided with a rearwardly projecting lug 204 which is actuated for purposes of reciprocating the bar by means of a pivoted lever 206. This lever is journaled upon a pin 208 extending forwardly from a lug 210 upon a plate 212. A slightly forwardly offset portion 214 of the plate projects under the lower extremity of the plate 40' and is secured in position by means of a screw 216 threaded through the plate and also threaded into a small fish plate 218 which serves to clamp the plate 214 in position. The lower extremity of the plate 212 is secured by means of a screw 220 threaded into the windshield frame.

Lever 206 is provided with a handle portion 222 having a rearwardly projecting pin 150' corresponding to the pin 150 disclosed in the previously described embodiment of the invention. This pin is provided with a sleeve 152' identical with the sleeve 152 and the attendant elements for this sleeve are indicated by the same numerals employed for designating the corresponding parts in the previously described embodiment of the invention but with prime marks applied for purposes of identification.

The opposite end of the windshield may be locked in closed position by any convenient device. For example, a latch device 230 identical in construction with the mechanism disclosed in Figure 7 of the present applicant. The opposite end of the windshield may conveniently be maintained in position of adjustment by means of a link mechanism 232 of friction type. Since the specific construction of this mechanism does not constitute a part of the present invention, it will not be described in detail.

The operation of this embodiment of the invention is obvious. The thumb levers are merely rotated to retract the links 72', thus releasing the pins 46' to permit raising of the windshield. That element may then be swung outwardly or inwardly as may be desired.

It is to be understood that numerous changes may be made in the embodiments of the invention disclosed without departure from the spirit thereof, or from the scope of the appended claims.

I claim:

1. An adjusting means for a windshield comprising a pair of links hinged to a vehicle body and having a slidable connection with the end of a windshield frame, latching means for the slidable connection for securing the links in a desired position of adjustment, cords connected to the latching means and being secured to an actuating pulley upon the windshield frame, a lever pivoted upon the frame and having a cam surface engaging a lug upon the pulley for tensioning the cords.

2. A windshield regulating device comprising actuating cables attached to a pulley rotatably mounted upon a bracket within the windshield frame, a lever pivoted upon the bracket and having a cam portion engaging an abutment upon the pulley for tensioning the cord.

3. A windshield regulating device comprising actuating cords attached to a pulley mounted upon a bracket, the bracket being secured to a windshield frame, a lever hinged upon the frame and having its end surface engaging the pulley for tensioning the cords, a thumb piece rotatably mounted upon the lever and including a portion engaging an abutment surface upon the vehicle body when the windshield is closed for locking the windshield in closed position.

4. A windshield regulator actuating device comprising a lever pivoted upon a pin and having means actuating a latching device for securing a windshield regulating link in a desired position of adjustment, a pin providing a crank handle upon the lever, a thumb piece rotatably mounted upon the pin, a spring within the thumb piece actuating the latter toward the lever, a lug upon the thumb piece adapted to engage a fixed portion of the vehicle frame for locking a windshield in retracted position.

5. A windshield regulating device comprising a bracket having a plate portion adapted to be secured to the exterior of a windshield frame and having a bifurcated lug extending through an opening in the windshield frame, a pulley journaled in the bifurcated portion, an actuating lever journaled between the windshield frame and a portion of the attaching plate, said lever having a cam portion engaging an abutment upon the pulley whereby to rotate the pulley and thus to tension the cord.

6. A windshield regulating device comprising a bracket having a plate portion adapted to be secured to the exterior of a windshield frame and having a bifurcated lug extending through an opening in the windshield frame, a pulley journaled in the bifurcated portion, an actuating lever journaled between the windshield frame and a portion of the attaching plate, said lever having a cam portion engaging an abutment upon the pulley whereby to rotate the pulley and thus to tension the cord, said actuating lever having a pin mounted thereupon, a sleeve rotatably mounted upon the pin, a lug upon the sleeve adapted to engage a fixed portion of the vehicle body for locking the windshield in retracted position.

7. A windshield regulating device comprising a bracket having a plate portion adapted to be secured to the exterior of a windshield frame and having a bifurcated lug extending through an opening in the windshield frame, a pulley journaled within the bifurcated portion, an actuating lever journaled between the windshield frame and a portion of the attaching plate, said lever having a cam portion engaging an abutment upon the pulley whereby to rotate the pulley and thus to tension the cord, said actuating lever having a pin mounted thereupon, a sleeve rotatably mounted upon the pin, a lug upon the sleeve adapted to engage a fixed portion of the vehicle body for locking the windshield in retracted position, said sleeve being longitudinally slidable upon the pin and spring means urging the sleeve toward the lever.

8. A windshield regulator actuating device comprising a lever hinged to a windshield and having an arm engaging a reciprocating link for controlling a windshield regulating link, a crank pin upon the lever, a thumb sleeve rotatably and slidably mounted upon the pin, a spring actuating the sleeve toward the lever, and a projection upon the sleeve engaging a fixed portion of the vehicle body to lock the windshield in closed position.

9. The combination with a supporting frame having an opening for a closure, of a metal closure frame of hollow construction pivoted to the supporting frame for closing the opening, a link member pivotally connected to the supporting frame and projecting through an elongated slot in one side portion of the hollow frame for slidable movement in and along such frame portion during hinging movement of the closure, an elongated movable member in such hollow frame portion, one of such members having a recess and the other member having a projection for engaging in said recess, arms in the closure frame and pivotally connected thereto and to opposed ends of such movable member for guiding and moving the latter into and out of the path of movement of the link member, while maintaining such movable member substantially parallel to said path of movement, and means accessible to the extension of the frame for moving the arms, whereby the movable member may be so moved as to cause the projection to lock in the recess or to be free of the recess and permit hinging movement of the closure.

10. The combination with a supporting frame having an opening for a closure, of a closure for such opening, pivoted to the supporting frame, said closure having a frame portion of hollow construction extending along one side thereof, a link pivotally connected to the supporting frame and projecting through an elongated slot in the hollow frame portion, means for retaining such end of the link in the hollow frame portion during hinging movement of the closure and movement of the link along the slot, a movable bar extending longitudinally in the hollow frame portion and provided with spaced recesses, means on the end of the link within the hollow frame portion for selectively engaging such recesses and locking the frame in adjusted position, and means including arms pivoted to the frame and ends of the bar and accessible for manual operation, for guiding and moving the bar into and out of the path of movement of the end of the link in the hollow frame portion while maintaining it substantially parallel to such path, so that the end of the link will be free to move longitudinally of the slot and the closure opened when the bar is in one position, and the closure locked in any adjusted position by moving the bar into the path of movement of such end of the link so as to permit engagement of one of such recesses with said means on the end of the link.

11. The combination with a supporting frame having an opening for a closure, of a closure pivoted to the supporting frame for closing the opening, said closure having a frame portion of hollow construction extending along one side, a link pivotally connected to the supporting frame and having its other end projecting through an elongated slot in the hollow frame portion, an elongated bar in the hollow frame portion and extending along the slot therein, rotatable means movably mounted in the closure frame and accessible to the exterior thereof for manual operation, for bodily guiding and moving the bar toward or from the slot without any substantial movement along the slot, and maintaining the bar substantially parallel to the path of movement of the inner end of the link, latching means spaced longitudinally of the bar, and means on the inner end of the link adapted to selectively cooperate with said latching means, whereby upon manipulating of such manually operable means the bar may be bodily moved into such position that the means on the inner end of the link will engage one of the latching means on the bar depending upon the hinging movement of the closure desired, and whereby upon manipulation of such manually operable means, the bar can be moved in a path substantially normal to and out of the path of movement of the inner end of the link to permit free swinging of the closure.

12. In combination, an automobile windshield frame, a windshield mounted therein for upward and outward swinging movements, a bracing arm secured to the windshield frame and slidably mounted at its free end to said windshield, means for securing the shield in any desired position of adjustment, said means comprising a movable rack bar, an element provided by the bracing arm for engagement therewith, a reciprocating lever provided by the windshield, and means for reciprocating the lever, said reciprocating lever having an interlocking connection with the rack bar whereby reciprocation of said lever moves said rack bar into or out of operative position with respect to said bracing arm.

13. In combination, a windshield frame, a windshield having a metal channel sash mounted for swinging movement therein, a bracing arm slidably mounted with respect to the channel sash, a movable rack mounted within the channel sash, a reciprocating member having an interlocking, actuating connection with said rack for causing said rack to move inwardly or outwardly in a transverse direction upon movement of said rack bar whereby it engages or disengages said bracing arm, and means for moving said reciprocating member.

14. In combination, a windshield frame, a windshield hinged therein for outward swinging movement and provided with a metal channel sash, a brace arm having a sliding connection with said channel sash, and means for preventing such sliding movement when it is desired to fix the shield in a selected position of adjustment, said means comprising a swingable locking element situated within the channel sash for engaging the bracing arm, a reciprocating element mounted within the metal channel sash and a connection between the reciprocating element and the locking element causing it to move into or out of locking engagement with the brace arm.

ALBERT T. POTTER.